US006258926B1

(12) United States Patent
Wiltzer et al.

(10) Patent No.: US 6,258,926 B1
(45) Date of Patent: Jul. 10, 2001

(54) PROCESS AND DEVICE FOR PRODUCING HIGH-VISCOSITY OR HIGHLY STABILIZED REACTION-STABLE POLYAMIDES, AND FOR CONTINUOUSLY DEMONOMERIZING POLYAMIDES

(75) Inventors: Karl-Heinz Wiltzer; Baldur Ebert, both of Bad Blankenburg; Hans Brutting; Peter Lausmann, both of Rudolstadt, all of (DE)

(73) Assignee: Polymer Engineering GmbH (DE)

( * ) Notice: Subject to any disclaimer, the term of this patent is extended or adjusted under 35 U.S.C. 154(b) by 0 days.

(21) Appl. No.: 08/894,656

(22) PCT Filed: Feb. 23, 1996

(86) PCT No.: PCT/EP96/00754

§ 371 Date: Oct. 27, 1997

§ 102(e) Date: Oct. 27, 1997

(87) PCT Pub. No.: WO96/26235

PCT Pub. Date: Aug. 29, 1996

(30) Foreign Application Priority Data

Feb. 23, 1995 (DE) ............................. 195 06 407

(51) Int. Cl.⁷ ............................. C08G 69/16; C08G 69/46
(52) U.S. Cl. ............................. 528/310; 528/313; 528/321; 528/322; 528/332; 528/335; 528/336; 528/340
(58) Field of Search ............................. 528/310, 313, 528/332, 322, 321, 335, 336, 340

(56) References Cited

U.S. PATENT DOCUMENTS 3,458,482 * 7/1969 Goto et al. ............................. 528/323
4,546,171 * 10/1985 Gotah et al. ............................. 528/310
5,283,315 * 2/1994 Kawakami et al. ............................. 528/326
5,362,448 * 11/1994 Kawakami et al. ............................. 528/326

FOREIGN PATENT DOCUMENTS

0074025 * 3/1983 (EP).
0094435 * 11/1983 (EP).
0530592 * 3/1993 (EP).

OTHER PUBLICATIONS

Patent Abstracts of Japan vol. 003, No. 068 (C–048), Jun. 13, 1979 & JP,A,54 041995 (Unitika Ltd), Apr. 3, 1979, See the Abstract.*
Patent Abstracts of Japan vol. 003, No. 157 (C–068), Dec. 22, 1979 & JP,A,54 133598 (Unitika Ltd), Oct. 17, 1979, See the Abstract.*

* cited by examiner

*Primary Examiner*—P. Hampton-Hightower
(74) *Attorney, Agent, or Firm*—Ostrolenk, Faber, Gerb & Soffen, LLP

(57) ABSTRACT

The invention concerns a process and device for producing high-viscosity or highly stabilized, reaction-stable polyamides, in particular polyamide 6, with reactive amino end groups of less than 50 µeq/g and for continuously demonomerizing polyamides. The object of the invention is to produce simply, reliably and economically a high-viscosity or highly stabilized reaction-stable polyamide, in particular polyamide 6, and if necessary to carry out continuous demonomerization. According to the invention, the molten polyamide is brought into intimate contact, or intimately mixed with preheated nitrogen in a reaction system in at least one stage and a specific dwell time is set for the melt in a liquid phase. During the production of polyamide 6, expelled lactam is processed and fed to a polymerization reactor.

27 Claims, 3 Drawing Sheets

PROCESS AND DEVICE FOR PRODUCING HIGH-VISCOSITY OR HIGHLY STABILIZED REACTION-STABLE POLYAMIDES, AND FOR CONTINUOUSLY DEMONOMERIZING POLYAMIDES

BACKGROUND OF THE INVENTION

The invention relates to a process and the device for carrying out the process for producing high-viscosity or highly stabilized, reaction-stable polyamides, in particular polyamide 6, with reactive amino end groups of less than 50 μeq/g and for continuously demonomerizing polyamides.

High-viscosity polyamide can be produced batchwise in autoclaves and continuously in polymerization reactors. However, only a maximum solution viscosity of 3.4 can be achieved by means of these processes (solution viscosity based on polymer-sulfuric acid solution containing 1 g of polyamide in 100 ml of 96% strength acid). However, there are also processes in which polyamide granules are subjected to postcondensation below the polyamide melting point with nitrogen at temperatures in the range of 140–190° C. and with dwell times of 20–60 h. These processes have the disadvantage that the establishment of high viscosities takes a very long time and such processes are therefore uneconomical. Patent PE 3923061 describes a process of this type for polyamide 6 postcondensation, in which the polyamide granules are treated in a heating zone over 35 h.

It is known that, during the polycondensation of ε-caprolactam to give a polyamide at the reaction temperature of 240–280° C. usually used in production, an equilibrium which results in a water-soluble fraction of about 10–13% is established. The equilibrium is temperature-dependent; the monomer content increases with increasing temperature. Copolyamides, one of whose starting materials is ε-caprolactam, likewise have a monomer content in chemical equilibrium. For the processing of the granules, it is necessary to reduce the monomer content. The following methods are available for this purpose:

extraction of the granules with hot water and those for demonomerizing the melt in vacuo.

The aqueous extraction predominantly used today is technically complicated and expensive since it is necessary to carry out the steps of spinning and cooling of the polyamide 6 melt in tape form, comminuting of the tapes to give granules, extraction of the granules, drying of the granules and reconversion of the granules to the molten state. This method of extraction with hot water can be carried out batchwise and continuously. It is used on a large industrial scale by all polyamide 6 producers.

In contrast, the route via the granules can be dispensed with in vacuum demonomerization. The melt arriving from the polycondensation reactor passes continuously through the demonomerization stage and is then fed directly to the spinning means.

U.S. Pat. No. 3,578,640 describes a process for demonomerizing the PA melt by means of a vacuum. In this process, after the vacuum stage, a very complicated technical procedure is carried out for discharging the melt and for the downstream finisher for further reducing the content of extractables. In this technique, for example, shaft seals inevitably lead to leaks on the vacuum system and associated oxidative damage to the melt by atmospheric oxygen which has penetrated. The oxidative damage cannot be suppressed even by feeding in inert gases, in particular nitrogen.

SUMMARY OF THE INVENTION

It is the object of the invention to provide a process and a device for carrying out the process of the type mentioned at the outset, which permits simple production of high-viscosity or highly stabilized, reaction-stable polyamides and, if necessary, demonomerization. The process starts from a melt which is originally virtually in chemical equilibrium. It is intended to produce a polymer which, is not in chemical equilibrium but which owing to the very low content of amino and carboxyl end groups, is very stable and thus scarcely undergoes any postcondensation.

DESCRIPTION OF THE INVENTION

Figure 1:
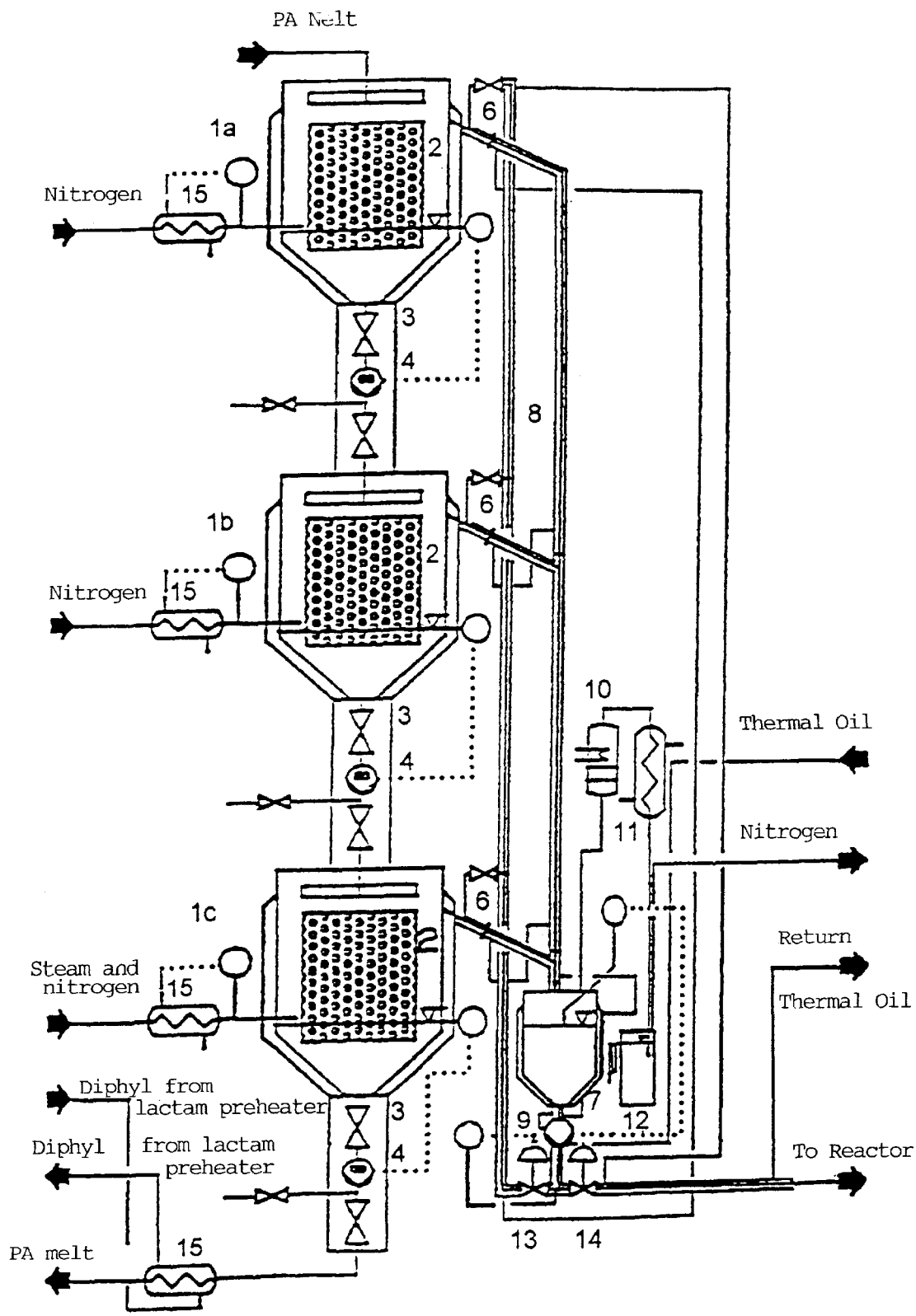
FIG. 1 schematically sets forth a plan for carrying out the process and the device of the invention.

This object is achieved by the features stated in patent claim 1. Advantageous embodiments and further developments of the invention are evident from the subclaims.

According to the invention, the melt is introduced continuously into the reaction container and is brought into intimate contact with, and/or intimately mixed with, preheated nitrogen, and a defined dwell time is set for the melt in a liquid phase in the lower part of the reaction container before said melt is continuously discharged, expelled substances being collected via pipelines and, particularly in the production of polyamide 6, expelled caprolactam being introduced via pipelines into a collecting container and being fed to a polymerization stage with continuous circulation.

In the reaction container, the polyamide melt is passed over surface-increasing and simultaneously surface-regenerating elements and/or into a melt phase by one or more horizontal separation means having passages, and is treated with preheated nitrogen.

The nitrogen preferably preheated to 150–300° C. before its entry into the reaction container, is introduced into the reaction container above the level of the melt phase present in the lower part of the reaction container and—where present—below a separation means. In the reaction container, the nitrogen is forced through a melt layer present above a separation means having passages.

The melt subjected to the reaction is fed to the liquid phase in the lower part of the reaction container via at least one overflow pipe which extends vertically through the separation means into the melt phase at the bottom of the reaction container. If surface-increasing elements are additionally used, they are treated with nitrogen after its emergence from the melt layer.

During the production of high viscosities and stabilities and, if necessary, the demonomerization, a melt phase is established for homogenization of the melt in every stage; the dwell time of the melt in the liquid phase is ≦30 min. The homogenization carried out in this manner has the advantage that differences in the molecular weight and in the residual extract between the edge and middle zone of the flowing melt are kept small. Such differences are to be expected owing to the postcondensation taking place over a period of time in combination with the flow profile, depending on the extent to which the polycondensation equilibrium was disturbed by the feeding in of nitrogen.

Depending on the parameters of the polymer to be produced, the polyamide melt is treated according to the invention in succession in one or more stages in reaction containers and is removed continuously from the lower part of the reaction container and introduced into the reaction container following the stage. After emergence of the melt from the last stage of the reaction container, the melt is cooled by means of a heat exchanger and the heat recovered is used for preheating the monomeric starting material, for example for preheating the caprolactam in the case of polyamide 6 melt. The caprolactam expelled in the treatment of polyamide 6 melt with nitrogen is fed to the collecting container in the upper region of the reaction container via a jacketed pipeline.

Since, in the treatment of polyamide 6 melt or copolyamide, one of whose starting materials was caprolactam, oligomers which may block the pipelines to the collecting container are expelled in addition to caprolactam, the material collected in the collecting container is preferably continuously circulated via a further pipeline through the pipelines leading from the individual stages to the collecting container. The pipelines are preferably heated, the resulting caprolactam/oligomer mixture being heated to a temperature such that the oligomers are dissolved in the caprolactam.

The expelled caprolactam and the simultaneously expelled oligomer can be processed and fed as part of the starting material to the polymerization plant.

In the case of the process according to the invention and the device for carrying out the process, the chemical equilibrium of the starting melt is continuously and deliberately disturbed on entry into the first reaction stage by the treatment with nitrogen.

In subsequent reaction stages, the establishment of an equilibrium of the melt is prevented by further treatment of 4.5 g of polyamide in 100 ml of distilled water, refluxed for 10 h at 100° C.).

Compared with the known polymerization processes, a substantially more advantageous space-time yield is achieved with the process developed.

In embodiment 1 of the invention, the production of high-viscosity spinnable polyamide 6 is illustrated in more detail below with reference to a device for carrying out the process:

The drawing in FIG. 1 shows the embodiment of a plant for carrying out the process and the device.

The plant described consists of three stages 1a, 1b and 1c. In each of the stages 1a to 1c, the melt is passed continuously into a reaction container via surface-increasing elements 2, and in each stage nitrogen is introduced in the temperature range 250–280° C. via a preheater 5. In stage 1a, a melt in the equilibrium state and at a temperature of 280° C. is fed in, it being possible for said melt to be a water-rich prepolymer from a pressure stage or a polymer from a postcondensation stage.

In each stage, caprolactam, oligomers and the water formed by a condensation reaction are expelled by the nitrogen fed in, the water contained in the chemical polycondensation equilibrium additionally being expelled in stage 1a when a water-rich prepolymer is fed in. Caprolactam, such a melt with nitrogen, the water formed in the phase involving the formation of amido groups (—NHCO—) by condensation of linear polymers being continuously expelled and hence a high reaction rate being achieved.

The treatment of the polyamide melt with dry preheated nitrogen results in a considerable viscosity increase which makes it possible to produce a polyamide melt having a solution viscosity of more than 3.8. In order, if necessary, to reduce the viscosity, which is greatly increased by the treatment with dry nitrogen, or to set said viscosity to a desired value, it is intended, if necessary, to supply superheated steam in addition to the nitrogen in one or more stages in order to moisten the nitrogen. If it is intended to produce a low-viscosity polyamide melt, a chain stabilizer is added to the starting material at the beginning of the polymerization process. A highly stabilized polymer exhibiting very little postcondensation is formed.

Owing to the small number of reactive amino end groups, the melt obtained and not in chemical equilibrium exhibits such little postcondensation that further processing to give films, filaments, etc. is not hindered.

Surprisingly, it was found that the content of extractables in the polymeric melt is reduced even to $\leq 1.6\%$ by the process according to the invention and the device for carrying out the process (content of extractables based on oligomers, water and nitrogen are discharged into a collecting container 7 via a pipeline 6 opening into the upper region of the respective stage.

The total reactor system is sealed off from the surrounding air by an immersion means 12. The surface-increasing elements 2 are formed in such a way that continuous surface regeneration occurs during the passage of the melt over these elements. In the example, expanded metal sheet is used for this purpose. Since the melt tends to form drops on the surface-increasing elements 2 above a limited length of the element and random distributor devices counteract this drop formation only to a slight extent, the treatment is carried out in several stages (1a, 1b, 1c).

After each stage, the melt is passed by a melt pump as discharge means 4 uniformly over the total width of the surface-increasing elements 2 of the reaction container of the subsequent stage.

In each process stage, a small melt phase is established for homogenization of the melt; the dwell time of the melt in this liquid phase is $\leq 30$ min. The total dwell time of the melt in the stages 1a, 1b and 1c is about 2 h, taking into account the passage times.

Heat is removed from the polyamide 6 melt by the evaporation of water and by vaporizing caprolactam. The heating of the melt to 280° C. for the next stage is effected in this example in the melt phase and in the downstream discharge device, consisting of slide valve 3 and melt pump 4. The melt is discharged continuously from each stage.

After the melt has been discharged from the last stage 1c, it is cooled in the heat exchanger 15 with diphyl from about 280° C. to about 245° C. The heat recovered is used, by means of a further heat exchanger not shown, for preheating the monomeric intermediate, in this case $\epsilon$-caprolactam, before entry into the polymerization reactor.

The monomeric caprolactam expelled from each reaction container 1a, 1b, 1c and collected via the pipeline 6 contains oligomers which may block the pipeline. For this reason, in addition to heating of the pipeline 6, a circulation pipeline 8 which is likewise heated and is fed via a pump 9 from the collection container 7 is provided. As a result of heating the pipelines, the resulting caprolactam/oligomer mixture is further heated to a temperature such that the troublesome oligomers are dissolved in the caprolactam.

In the circulation pipeline 8, a pressure of 7 bar (gauge pressure) is established after the pump 9 up to the control valve 13. By means of this pressure, the caprolactam/oligomer mixture obtained in the collecting container 7 is transported as a part-stream via the control valve 14 into the pressure stage of the polymerization plant to the caprolactam, the control valve 14 operating as a function of the level in the collecting container 7.

If water-enriched prepolymer is fed into the device according to the invention, this water is removed from the caprolactam/oligomer mixture in the collecting container 7 via a rectifier 10. The steam emerging from the rectifier 10 is condensed in the heat exchanger 11.

In the treatment of the polyamide melt with dry nitrogen, a considerable viscosity increase occurs. If this viscosity increase is too large or if it is desired exactly to adjust the viscosity of the material emerging at the outlet of the last stage, steam is introduced in one or more stages together with nitrogen or alone, as described with reference to stage 1c.

Without the supply of steam, it is possible to produce a high-viscosity, stable polyamide 6 melt having a solution viscosity of 3.8 and an amino end group concentration of 25 $\mu$eq/q and a content of extractables of 2.5%. Viscosity control in the range of 3.2–3.8 is possible by passing the steam/nitrogen mixture into the last process stage.

Embodiment 2 illustrates a device for carrying out the process, which starts from the arrangement shown in embodiment 1.

The preheated nitrogen is fed only into the lower-most stage 1c, whereupon nitrogen then flows through the stages 1b, 1a above in a sort of series circuit, supplementation with fresh nitrogen additionally being effected in each stage. The resulting caprolactam/oligomer/nitrogen mixture is then removed only from stage 1a and fed to the collecting container 7.

Embodiment 3 of the invention describes the production of a spinnable, low-viscosity polyamide 6 melt, in which the arrangement shown in embodiment 1 is used as a starting point.

If it is intended to produce a polyamide 6 melt having a solution viscosity of 2.4 and different amino end group concentration, there are several possibilities to do so if acetic acid is used as a stabilizer.

1. Stabilization of the reactor mixture at the beginning of the polymerization process with 0.34% of acetic acid. In each stage, preheated dry nitrogen at 280° C. is fed in. This polymer has an amino end group concentration of 6 $\mu$eq/g.

2. Stabilization of the reaction mixture at the beginning of the polymerization process with 0.18% of acetic acid. Preheated dry nitrogen at 280° C. is fed into each stage. This polymer has an amino end group concentration of 31 $\mu$eq/g.

3. Stabilization of the reaction mixture at the beginning of the polymerization process with 0.30% of acetic acid. Preheated dry nitrogen at 280° C. is fed into the stages 1a and 1b and preheated dry steam at 280° C. into the stage 1c.

This polymer has an amino end group concentration of 11 $\mu$eq/g. When dry preheated nitrogen or steam or a combination of the two gases is fed in, a total extract of $\leq 1.8\%$ is established by the expulsion of caprolactam and oligomers from the polyamide 6 melt. In order to avoid troublesome reformation of extractables in the melt, the dwell time of the melt in the liquid phase before each melt pump may be not be more than 30 min. This melt is suitable for the production of filaments by the POY and FDY process.

Embodiment 4 describes the production of a spinnable, high-viscosity polyamide 6 melt. The production is carried out in principle as described in embodiment 1, except that two reactor stages 1a and 1b are used, the dewatering of the melt shown in FIG. 2 additionally being carried out in stage 1a.

Figure 2:
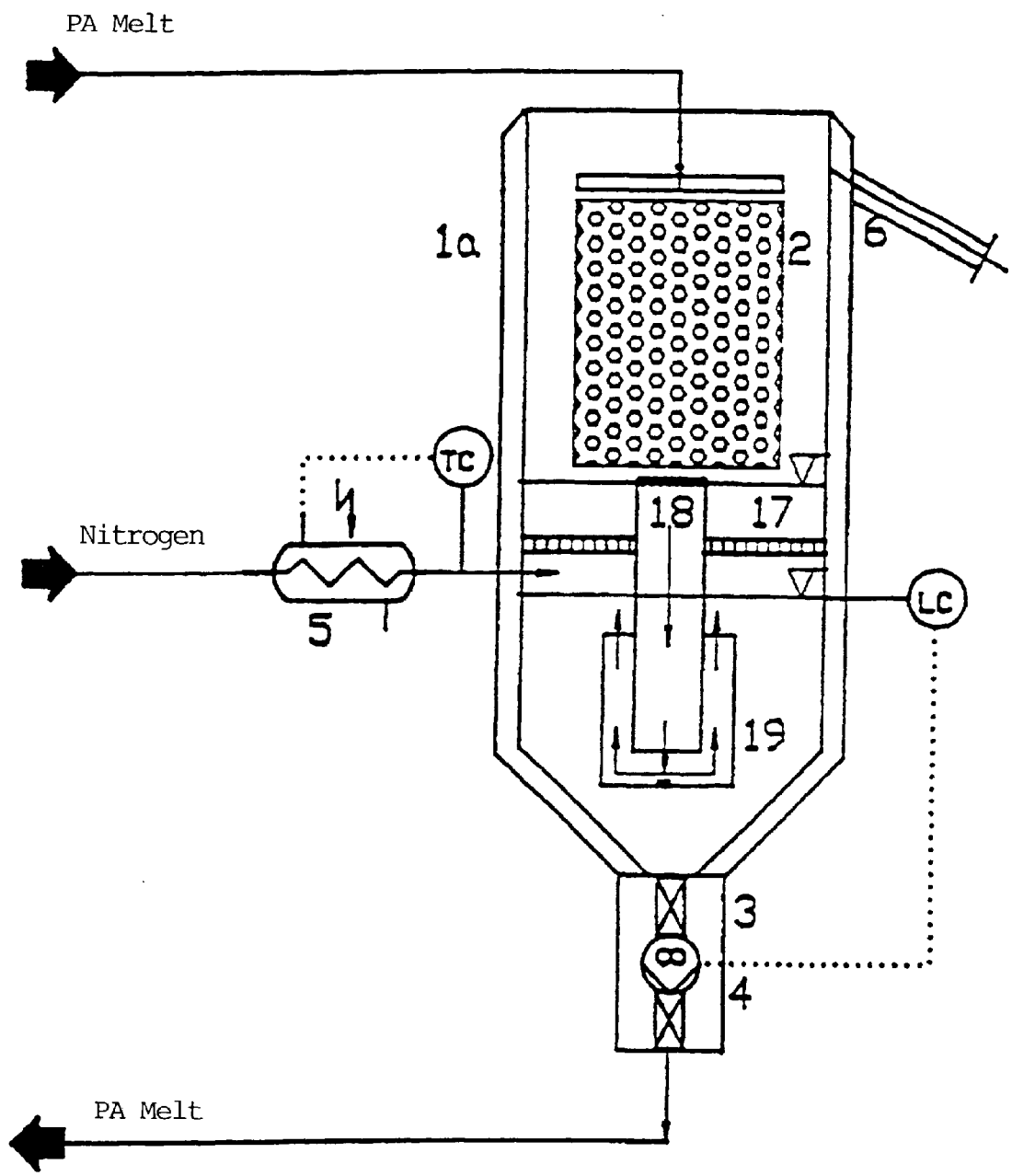
FIG. 2 shows a reaction container of a stage with a device for direct introduction of nitrogen into a melt phase.

FIG. 2 shows the reaction container of a stage with a device for direct introduction of nitrogen into a melt phase in combination with surface-increasing elements from FIG. 1.

The polyamide 6 melt flows over the surface-increasing element 2 into a melt layer which is adjusted by the separation means having passages 17, for example a perforated plate.

The height of the melt layer is determined by the height of the overflow pipe 18. Nitrogen is passed via the preheater 5 under the separation means having passages 17 and directly through the polyamide 6 melt layer. The nitrogen is then further transported on the melt film of the surface-increasing element 2 and, as already described in embodiment 1, is further treated together with the expelled water, the caprolactam and the oligomers.

The polyamide 6 melt running out of the melt layer through the overflow pipe 18 enters the melt phase which is positioned underneath and in which the overflow pipe 18 extends close to the bottom. In order to establish a uniform dwell time of this polyamide 6 melt in the lower melt phase, the melt is passed upward again through a container 19 which is open at the top and is provided with an outlet hole. The outlet hole is a small hole which ensures the melt immersion tank 19 is emptied on running down the polymerization plant. By the discharge means 4, for example a melt pump, the polyamide 6 melt is introduced into the reaction stage underneath or fed for granulation or directly further processed. A polymer having a solution viscosity of 3.65 and a content of extractables of 2.5% is formed.

This additional dewatering and demonomerization described can be used in one or more reaction containers of stages 1a and 1b for the demonomerization of the melt and for the production of a high-viscosity melt.

Embodiment 5 describes the production of a spinnable polyamide 6 melt of normal viscosity. The production is carried out in principle according to embodiment 4. Before the beginning of the polymerization process, the reaction mixture is stabilized with 0.12% of acetic acid. Instead of nitrogen, preheated dry steam at 280° C. is fed in. The polymer produced has a solution viscosity of 2.4 and an amino end group concentration of 41 $\mu$eq/g and a content of extractables of 2.5%.

Figure 3:
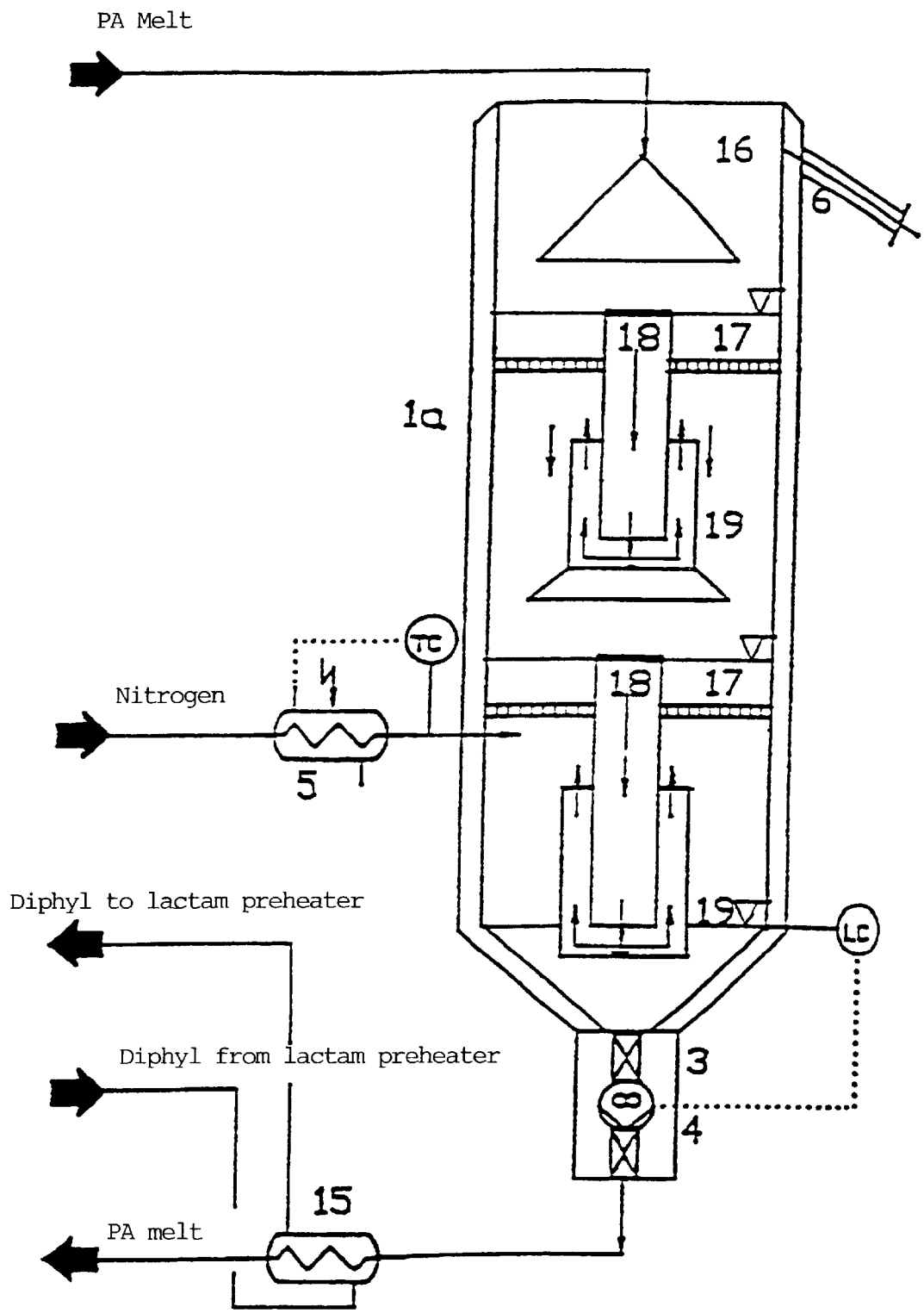
FIG. 3 shows another device used in the present invention.

Embodiment 6 describes the production of a spinnable, high-viscosity polyamide 6 melt. The drawing in FIG. 3 shows the embodiment of a plant for carrying out the process and the device. A polyamide 6 melt in the equilibrium state is introduced via the melt distributor 16 into the melt layer underneath, which is adjusted by the separation means having passages 17, for example a perforated plate. The height of the melt layer is determined by the height of the overflow pipe 18. The polyamide 6 melt running out of the melt layer through the overflow pipe 18 enters a melt immersion tank 19 underneath, which has a small hole for emptying residues at the lowermost point. The overflowing melt from the melt immersion tank 19 runs down the container wall onto a melt distributor and from there into the melt layer underneath. While the melt runs down the container wall and on the distributor, separation of the nitrogen from the melt takes place.

From the lower melt layer, via the separation means having passages 17, the melt likewise runs via the discharge pipe 18 into the melt immersion tank 19 and over its container wall into the melt phase at the bottom of the reaction container. Nitrogen is forced via the preheater 9, below the lowest separation means 17, through the polyamide 6 melt and then flows through the melt layers above.

Caprolactam, oligomers and water are removed from the polyamide 6 melt. This mixture leaves the reaction apparatus via the pipeline 6 and is further treated as described in embodiment 1. After the discharge of the melt from this reactor, it is cooled in the heat exchanger 15, as described in Example 1.

The number of individual stages in this reactor can be increased in order to establish a higher viscosity and/or to establish a lower content of extractables in the polyamide 6 melt.

What is claimed is:

1. A process for producing high-viscosity or highly stabilized polyamides with reactive amino end groups of <50 µeq/g and for continuously demonomerizing polyamides by subjecting a melt which is in chemical equilibrium to postcondensation by removing the low molecular weight polycondensate, wherein the melt is introduced continuously into a reaction container and is brought into intimate contact with, or intimately mixed with, preheated, dry nitrogen, and a defined dwell time is set forth for the melt in a liquid phase in the lower part of the reaction container before continuous discharge, expelled substances being collected via pipelines and particularly in the production of polyamide 6, expelled caprolactam being introduced into a collecting container, continuously circulated and processed and fed to a polymerization reactor.

2. The process as claimed in claim 1, wherein the polyamide melt in the reaction container is passed over surface-increasing and simultaneously continuously surface-regenerating elements and is treated with nitrogen.

3. The process as claimed in claim 1, wherein the polyamide melt in the reaction container is passed into a melt layer which is formed above a separator having passages, nitrogen being forced through this melt layer below the separator and the melt being fed via a discharge means, which extends vertically through the separator into the melt phase at the bottom of the reaction container, to the liquid phase in the lower part of the reaction container.

4. The process as claimed in claim 1, wherein the polyamide melt is passed over surface-increasing elements in a melt layer formed over the separator having passages.

5. The process as claimed in any of claim 1, wherein the nitrogen is preheated to temperatures up to 300° C. before its entry into the reaction container, above the level of the melt phase present in the lower part of the reaction container.

6. The process as claimed in any of claim 1, wherein the melt phase is maintained in the lower part of the reaction container and the dwell time of the melt in the liquid phase is set at ≦30 min.

7. The process as claimed in any of claim 1, wherein the polyamide melt is treated in succession in a plurality of stages in reaction containers and is removed continuously from the lower part of the reaction container and introduced into the reaction container following the stage.

8. The process as claimed in claim 5, wherein the preheated nitrogen is fed into the lowermost stage and flows therefrom through the stages above.

9. The process as claimed in any of claim 5, wherein preheated nitrogen is fed into each stage above the lowermost stage.

10. The process as claimed in claim 5, wherein steam is fed to at least one stage, in addition to the nitrogen.

11. The process as claimed in claim 1 and 7, wherein caprolactam or oligomeric caprolactam or both expelled in the upper part of the reaction container are fed via pipelines to a collecting container.

12. The process as claimed in claim 11, wherein the pipelines transporting the caprolactam or the oligomeric caprolactam or both are heated and wherein the caprolactam or the oligomeric caprolactam collected in the collecting container are continuously circulated in these pipelines.

13. The process as claimed in any of claim 1, wherein both the individual stages and the collecting container for the caprolactam or the oligomeric caprolactam or both are sealed off from the surrounding air.

14. The process as claimed in claim 1, wherein the excess water in the expelled caprolactam or both in the oligomeric caprolactam is separated off by means of a rectifier and is removed.

15. The process as claimed in claim 11, wherein the caprolactam or oligomeric caprolactam or both collected in the collecting container are fed to a polymerization reactor.

16. A device for carrying out the process as claimed in claim 1, wherein the device comprises a reaction container (1a) through which polyamide melt flows and which has a horizontal separator having passages (17) and at least one overflow pipe (18) which passes through the separator and opens, in the vicinity of the bottom of the reaction container, into a container (19) open at the top, or the reaction container (1a) contains surface-increasing elements (2) in the upper part and has slide valves (3) and melt discharge means (4) at the bottom of the reaction container, and a feed means with preheater (5) for nitrogen is arranged on the reaction container (1a) and a discharge means with pipeline (6) is arranged in the upper region, a processing system being arranged downstream of said discharge means.

17. The device as claimed in claim 16, wherein the reaction container (1a) contains a separator having passages (17) and additionally surface-increasing elements (2) in the upper part.

18. The device as claimed in claim 16 wherein the reaction container (1a) contains a melt distributor (16) and at least two separator means arranged one on top of the other and having passages (17) and each having at least one overflow pipe (18) and containers (19) open at the top.

19. The device as claimed in claim 16, wherein the feed means with preheater (5) for nitrogen is arranged above the level of the melt phase present in the lower part of the reaction container (1a) and below the separator having passages (17).

20. The device as claimed in claim 16, wherein, in in the reaction container (1a) through which molten polyamide 6 flows, the discharge means for caprolactam is a jacketed pipeline (5) and is arranged in the upper region of the reaction container (1a), at least above the melt level present above a separator having passages (17).

21. The device as claimed in claim 16, wherein up to 8 reaction containers (1a, 1b, 1c . . . ) are connected to one another in series in a plurality of stages.

22. The device as claimed in claim 19, wherein a feed means with preheater (5) for dry nitrogen is arranged at least on the reaction container (1c) of the last stage and there is a series connection with the upstream reaction containers (1b, 1a) for the nitrogen feed.

23. The device as claimed in claim 20, wherein the jacketed pipeline (6) opens into the upper part of the collecting container (7) and, from the outlet of the collecting container (7), the jacketed pipeline (8) is connected via a pump (9) and a pressure valve (13) to a pipeline (6) in the vicinity of the caprolactam discharge means of the reaction container (1a, 1b, 1c).

24. The device as claimed in claim 20, wherein a line which connects the collecting container (7) to a rectifier (10), heat exchanger (11) and an immersion tank (12) is arranged on the upper part of the collecting container (7).

25. The device as claimed in claim 20, wherein, at the outlet of the collecting container (7) and after the pump (9), a pipeline is led via the control valve (14) to a polymerization reactor.

26. The device as claimed in claim 16, wherein the melt discharge means (4) of the last reaction stage is connected to the heat exchanger (17).

27. The process is claimed in claim 1 in which the melt is a melt of polyamide 6.

* * * * *